US011647143B2

(12) United States Patent
Matsuzawa et al.

(10) Patent No.: US 11,647,143 B2
(45) Date of Patent: May 9, 2023

(54) PRINT CONTROL DEVICE, PRINT CONTROL METHOD, AND PRINT CONTROL PROGRAM

(71) Applicant: SEIKO EPSON CORPORATION, Tokyo (JP)

(72) Inventors: Tomoki Matsuzawa, Shiojiri (JP); Rinzo Kasuga, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/815,027

(22) Filed: Jul. 26, 2022

(65) Prior Publication Data

US 2023/0024881 A1    Jan. 26, 2023

(30) Foreign Application Priority Data

Jul. 26, 2021   (JP) .............................. JP2021-121307

(51) Int. Cl.
*H04N 1/32*   (2006.01)
*H04N 1/00*   (2006.01)
*G06F 3/12*   (2006.01)
*G06K 15/02*   (2006.01)

(52) U.S. Cl.
CPC ..... *H04N 1/32598* (2013.01); *H04N 1/00204* (2013.01); *H04N 1/32128* (2013.01); *H04N 1/32625* (2013.01); *H04N 1/32673* (2013.01)

(58) Field of Classification Search
None
See application file for complete search history.

(56) References Cited

U.S. PATENT DOCUMENTS

2004/0122932 A1 * 6/2004 Mickeleit .............. G06F 3/1288
358/1.15
2019/0303076 A1 * 10/2019 Kato ..................... G06F 3/1254

FOREIGN PATENT DOCUMENTS

| JP | 2004518223 | * | 6/2004 | ............... G06F 3/12 |
| JP | 2008108010 | * | 5/2008 | ............... G06F 3/12 |
| JP | 2009193358 A | | 8/2009 | |
| JP | 2020144523 | * | 9/2020 | ............... G06F 3/12 |

* cited by examiner

*Primary Examiner* — Beniyam Menberu
(74) *Attorney, Agent, or Firm* — Chip Law Group

(57) ABSTRACT

A print management unit attaches an identifier to print data that goes through a custom processing unit functioning by execution of a custom class driver, and delivers the print data with the identifier attached, to a standard print control unit. The custom processing unit deletes the identifier from the print data delivered from the standard print control unit and customizes processing of causing a printer to execute printing, based on the print data. The print management unit detects a read state of the custom class driver by execution of an OS. When the read state indicates a failure in reading the custom class driver, the print management unit delivers the print data without the identifier attached, to the standard print control unit, and thus causes the printer to execute the printing that is limited via a standard communication control unit or to stop the printing.

8 Claims, 9 Drawing Sheets

FIG. 4

USB STANDARD COMMAND 230

| ... | Key1:Val1, Key2:Val2 | ... | PRINTER IDENTIFICATION INFORMATION 240 | ... |

CUSTOM PROCESSING UNIT U4
CUSTOM CLASS DRIVER 152

USB STANDARD COMMAND 230

| ... | Key1:Val1, Key2:Val2, Key3:Val3 | ... | PRINTER IDENTIFICATION INFORMATION 240 | ... |

CUSTOM FIELD 231

OPTION

REDUCE ABRASION : OFF

SAVE BLANK PAPER : OFF

OPERATING NOISE REDUCTION MODE : OFF

USE "BLACK-ONLY MODE" : OFF

AUTOMATIC CASSETTE CHANGE : OFF

BIDIRECTIONAL PRINTING : ON

GIVE WARNING : ON

SUPPORT BIDIRECTIONAL COMMUNICATION WHEN PRINTING : ON

EXECUTE PRINTING WITH LIMITED FUNCTIONS WHEN FAILING IN READING CUSTOM CLASS DRIVER : ON — 301

CANCEL    OK — 302

PRINT CONTROL DEVICE, PRINT CONTROL METHOD, AND PRINT CONTROL PROGRAM

The present application is based on, and claims priority from JP Application Serial Number 2021-121307, filed Jul. 26, 2021, the disclosure of which is hereby incorporated by reference herein in its entirety.

BACKGROUND

1. Technical Field

The present disclosure relates to a print control device, a print control method, and a print control program for a computer causing a printer to execute printing.

2. Related Art

A USB printer communicating with a personal computer in conformity with the Universal Serial Bus standard, abbreviated as USB, is known. The communication between the personal computer and the USB printer uses a USB printer class driver attached to the operating system, abbreviated as OS. The communication also uses a custom class driver for wrapping, that is, hiding, the function of the USB printer class driver. The custom class driver is used to process data transmitted to the printer and to customize the USB communication sequence and is arranged between an OS-standard print system service and the USB printer class driver.

For the sake of reference, an information processing device disclosed in JP-A-2009-193358 reports that a communication error is expected to occur, when it is determined that model-specifying information coinciding with the model-specifying information about a non-conforming USB storage device that is expected to have a communication error is stored in a storage unit.

In some cases, the personal computer executing the OS may fail in reading the custom class driver due to factors such as OS update. When the personal computer fails in reading the custom class driver, problems occur such as a malfunction of the printer and an inability to execute proper communication.

SUMMARY

A print control device according to an aspect of the present disclosure is a print control device for a computer in which a standard print control unit functioning by execution of an operating system causes a printer to execute printing according to print data via a standard communication control unit functioning by the execution of the operating system. The print control device includes: a custom processing unit functioning by execution of a custom class driver for hiding the function of the standard communication control unit and for customizing processing of causing the printer to execute the printing, based on the print data delivered from the standard print control unit; and a print management unit attaching an identifier to the print data that goes through the custom processing unit and delivering the print data with the identifier attached, to the standard print control unit. When the identifier is attached to the print data delivered from the standard print control unit, the custom processing unit deletes the identifier from the print data and customizes the processing of causing the printer to execute the printing, based on the print data. The print management unit detects a read state of the custom class driver by the execution of the operating system. When the read state indicates a failure in reading the custom class driver, the print management unit delivers the print data without the identifier attached, to the standard print control unit, and thus causes the printer to execute the printing that is limited via the standard communication control unit or to stop the printing.

A print control method according to another aspect of the present disclosure is a print control method for a computer in which a standard print control unit functioning by execution of an operating system causes a printer to execute printing according to print data via a standard communication control unit functioning by the execution of the operating system. The print control method includes: a custom processing step in which the computer executes a custom class driver for hiding the function of the standard communication control unit and for customizing processing of causing the printer to execute the printing, based on the print data delivered from the standard print control unit; and a print management step in which the computer executes processing of attaching an identifier to the print data that goes through the custom class driver and delivering the print data with the identifier attached, to the standard print control unit. In the custom processing step, when the identifier is attached to the print data delivered from the standard print control unit, the computer deletes the identifier from the print data and customizes the processing of causing the printer to execute the printing, based on the print data. In the print management step, the computer detects a read state of the custom class driver by the execution of the operating system, and when the read state indicates a failure in reading the custom class driver, the computer delivers the print data without the identifier attached, to the standard print control unit, and thus causes the printer to execute the printing that is limited via the standard communication control unit or to stop the printing.

A non-transitory computer-readable storage medium according to still another aspect of the present disclosure stores a print control program. The print control program is for a computer in which a standard print control function that an operating system causes the computer to implement causes a printer to execute printing according to print data via a standard communication control function that the operating system causes the computer to implement. The print control program includes a custom class driver and a filter module. The custom class driver causes the computer to implement a custom processing function for hiding the standard communication control function and for customizing processing of causing the printer to execute the printing, based on the print data delivered from the standard print control function. The filter module causes the computer to implement a print management function for attaching an identifier to the print data that goes through the custom class driver and for delivering the print data with the identifier attached, to the standard print control function. When the identifier is attached to the print data delivered from the standard print control function, the custom processing function deletes the identifier from the print data and customizes the processing of causing the printer to execute the printing, based on the print data. The print management function detects a read state of the custom class driver by the execution of the operating system. When the read state indicates a failure in reading the custom class driver, the print management function delivers the print data without the identifier attached, to the standard print control function, and thus causes the printer to execute the printing that is limited via the standard communication control function or to stop the printing.

BRIEF DESCRIPTION OF THE DRAWINGS

FIG. 4 schematically shows an example where a custom field is attached to a USB standard command.

FIG. 6 schematically shows an example of an option setting screen for selecting processing executed when the reading of the custom class driver has failed.

DESCRIPTION OF EXEMPLARY EMBODIMENTS

An embodiment of the present disclosure will now be described. The embodiment described below is simply an example of the present disclosure. Not all the characteristics described in the embodiment are necessarily essential for the solution according to the present disclosure.

(1) Outline of Technique Included in Present Disclosure

First, an outline of a technique included in the present disclosure is described with reference to examples shown in FIGS. 1 to 9. The drawings according to this application schematically show examples. The rate of enlargement in each direction in these drawings may vary and the drawings may not be consistent with each other. Each element in the present technique is not limited to a specific example denoted by a reference symbol. In the "Outline of Technique Included in Present Disclosure" section, a term in parentheses means a supplementary explanation of the term immediately before.

Aspect 1

Figure 1:
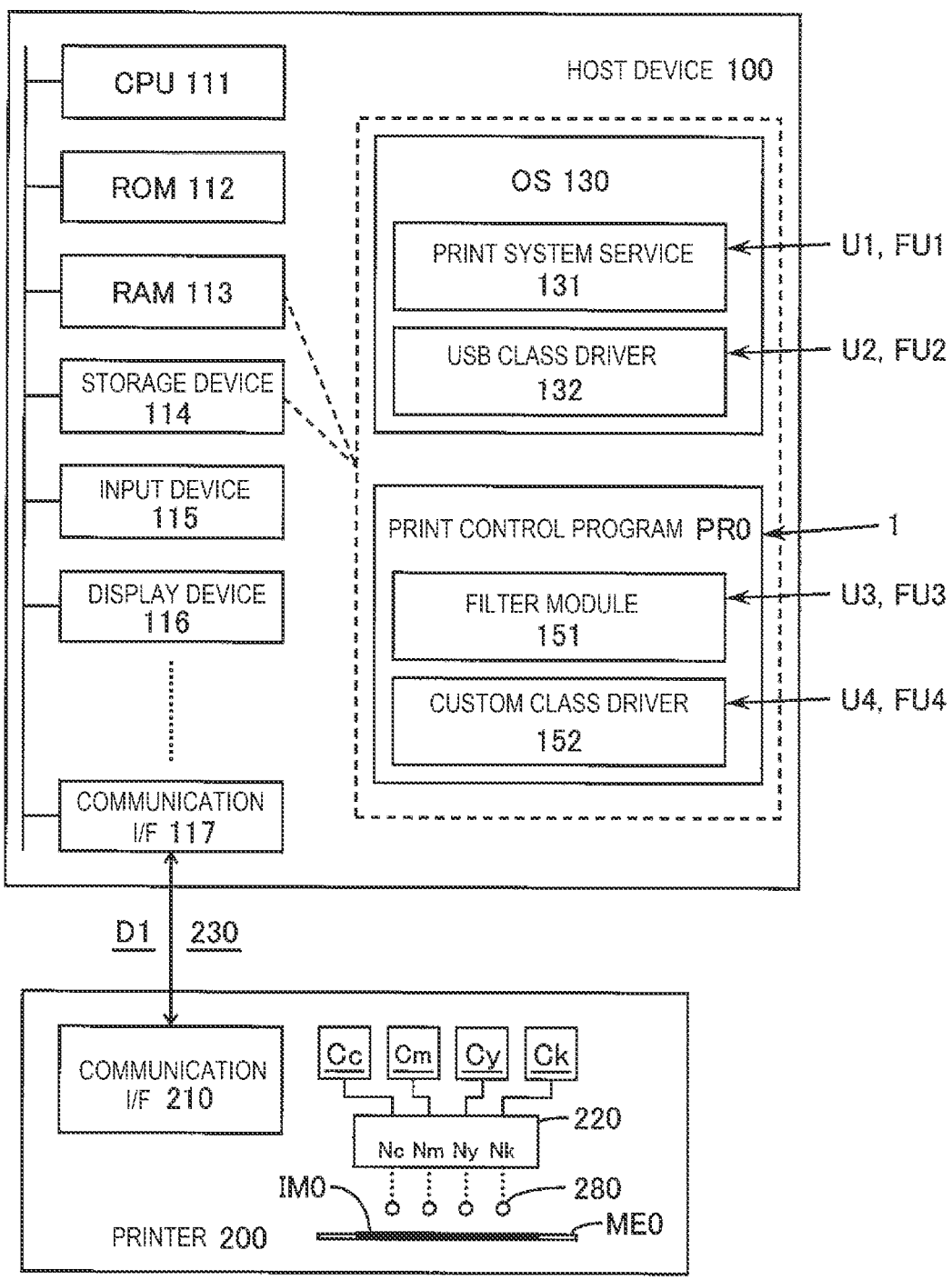
FIG. 1 is a block diagram schematically showing an example of the configuration of a computer and a printer.
Figure 2:
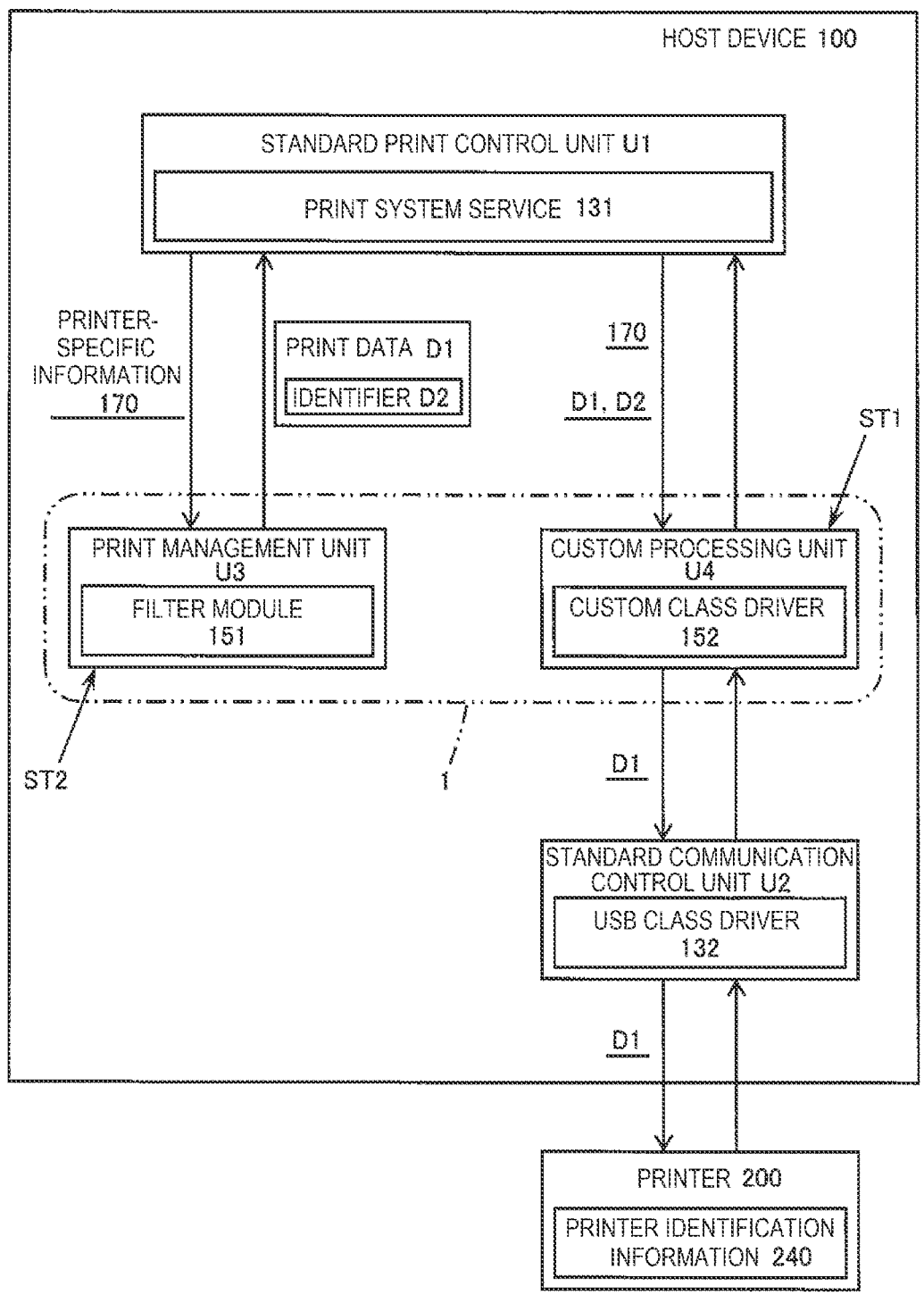
FIG. 2 is a block diagram schematically showing an example of the relationship between components of the computer and the printer.
Figure 3:
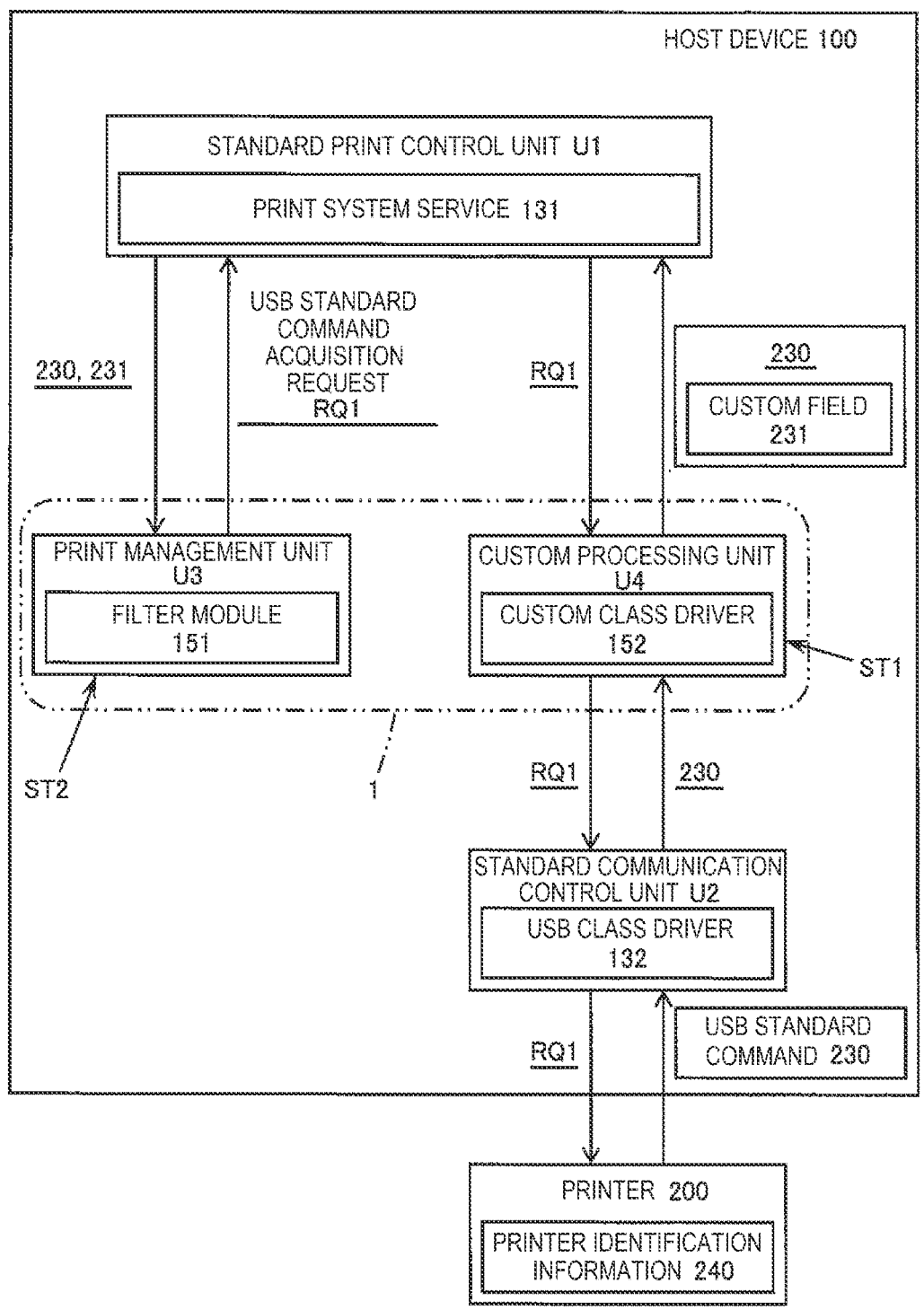
FIG. 3 schematically shows an example where a custom field is attached to a USB standard command so as to determine the read state of a custom class driver.

A print control device 1 according to an aspect of the present technique is a print control device 1 for a computer (for example, a host device 100) in which a standard print control unit U1 functioning by execution of an operating system (OS) causes a printer 200 to execute printing according to print data D1 via a standard communication control unit U2 functioning by the execution of the operating system (OS), as shown in FIGS. 1 to 3 and the like. The print control device 1 includes a custom processing unit U4 and a print management unit U3. The custom processing unit U4 functions by execution of a custom class driver 152, hides the function of the standard communication control unit U2, and customizes processing of causing the printer 200 to execute the printing, based on the print data D1 delivered from the standard print control unit U1. The print management unit U3 attaches an identifier D2 to the print data D1 going through the custom processing unit U4 and delivers the print data D1 with the identifier D2 attached, to the standard print control unit U1. When the identifier D2 is attached to the print data D1 delivered from the standard print control unit U1, the custom processing unit U4 deletes the identifier D2 from the print data D1 and customizes the processing of causing the printer 200 to execute the printing, based on the print data D1. The print management unit U3 detects a read state of the custom class driver 152 by the execution of the operating system (OS). When the read state indicates a failure in reading the custom class driver 152, the print management unit U3 delivers the print data D1 without the identifier D2 attached, to the standard print control unit U1, and thus causes the printer 200 to execute the printing that is limited via the standard communication control unit U2 or to stop the printing.

When the custom class driver 152 is read by the execution of the OS, the print data D1 with the identifier D2 attached is delivered from the print management unit U3 to the custom processing unit U4 via the standard print control unit U1. The custom processing unit U4 deletes the identifier D2 from the print data D1 and customizes the processing of causing the printer 200 to execute the printing, based on the print data D1.

When the reading of the custom class driver 152 by the execution of the OS has failed, the print data D1 delivered from the print management unit U3 to the standard print control unit U1 is delivered from the standard print control unit U1 directly to the standard communication control unit U2. When the identifier D2 is attached to the print data D1, the printer 200 cannot correctly interpret the print data D1 received from the standard communication control unit U2 and may malfunction or print information that makes no sense. When the reading of the custom class driver 152 has failed, the print management unit U3 according to the aspect 1 delivers the print data D1 without the identifier D2 attached, to the standard print control unit U1. Thus, the print data D1 without the identifier D2 attached is delivered to the printer 200 via the standard communication control unit U2 or the printer 200 stops the printing. When the printer 200 executes the printing, the printer 200 can properly execute the printing according to the print data D1 without the identifier D2 attached. Therefore, the aspect 1 can provide a print control device that restrains trouble in printing due to a failure in reading the custom class driver.

The printer is not limited to a single printing machine and includes a copy machine, a facsimile, a multifunction machine having a document reading function and a printing function, and the like. This additional note also applies to the aspects given below.

The read state of the custom class driver can be detected in various forms, as described in the aspects 2 and 3 given below.

Aspect 2

Figure 7:
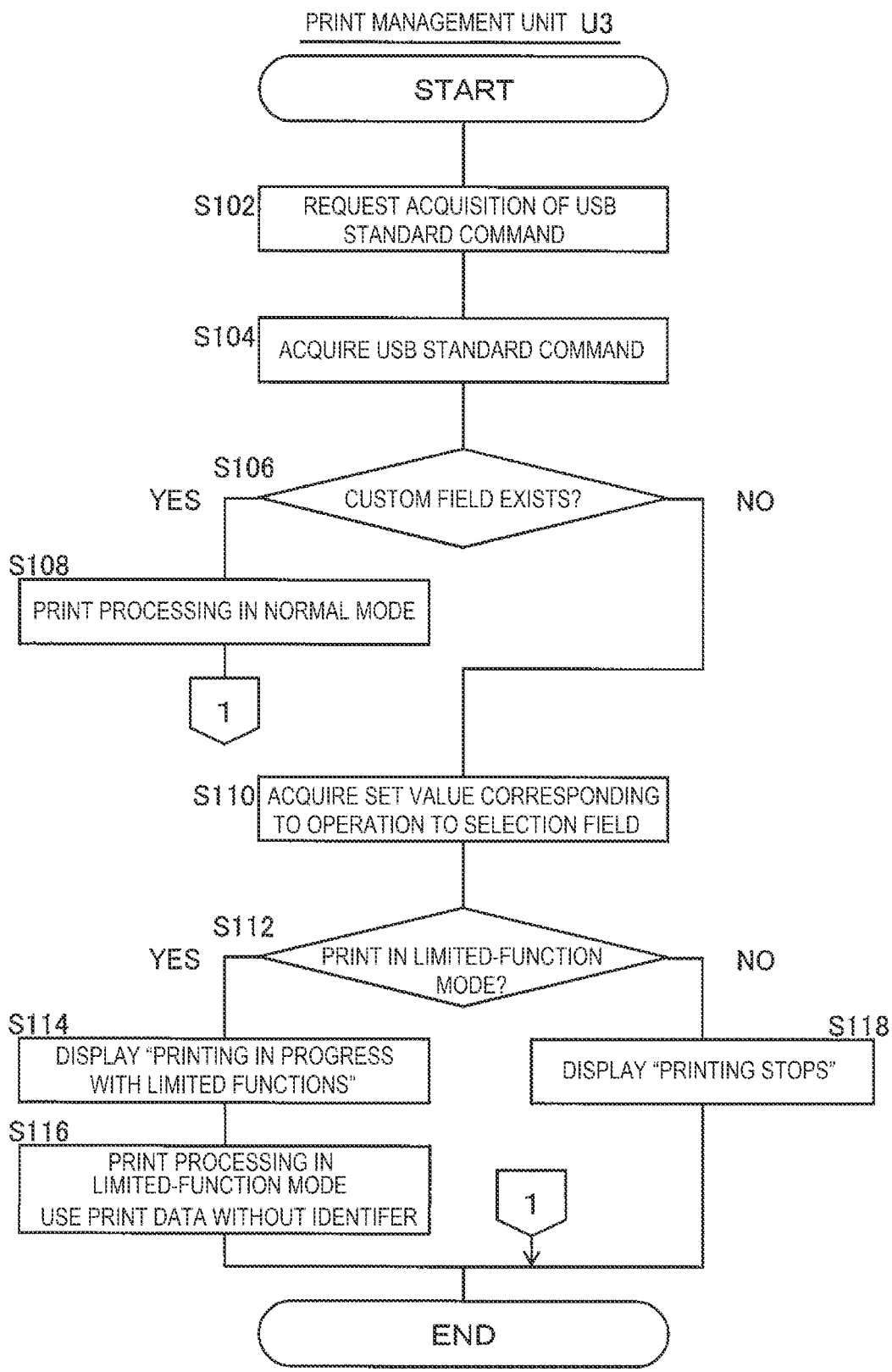
FIG. 7 is a flowchart showing an example of print control processing corresponding to the read state of the custom class driver according to the flow shown in FIG. 3.

The standard communication control unit U2 may communicate with the printer 200 in conformity with a USB standard. As shown in FIG. 3, the print management unit U3 may request the standard print control unit U1 to acquire a USB standard command 230 that identifies the printer 200. When a request to acquire the USB standard command 230 (for example, USB standard command acquisition request RQ1) is delivered to the custom processing unit U4 from the standard print control unit U1, the custom processing unit U4 may acquire the USB standard command 230 from the printer 200 via the standard communication control unit U2. The custom processing unit U4 may attach a custom field 231 to the USB standard command 230, as shown in FIGS. 3 and 4. The custom processing unit U4 may deliver the USB standard command 230 with the custom field 231 attached, to the standard print control unit U1. The print management unit U3 may determine whether the custom field 231 is attached to the USB standard command 230 delivered from the standard print control unit U1 or not, and thus may detect the read state, as shown in FIG. 7. When the custom field 231 is not attached, the print management unit U3 may deliver the print data D1 without the identifier D2 attached, to the standard print control unit U1, and thus may cause the printer 200 to execute the printing that is limited via the standard communication control unit U2 or to stop the printing.

When the custom class driver 152 is read by the execution of the OS, the custom processing unit U4 attaches the custom field 231 to the USB standard command 230 acquired from the printer 200 via the standard communication control unit U2 and delivers the USB standard command 230 with the custom field 231 attached, to the print management unit U3 via the standard communication control unit U2. When the custom field 231 is attached to the USB standard command 230, the print management unit U3 determines that the reading of the custom class driver 152 is successful, and delivers the print data D1 with the identifier D2 attached, to the standard print control unit U1, and thus can cause the printer 200 to execute customized printing.

When the reading of the custom class driver 152 by the execution of the OS has failed, the custom field 231 is not attached to the USB standard command 230 acquired from the printer 200 via the standard communication control unit U2. Therefore, the USB standard command 230 without the custom field 231 attached is delivered to the print management unit U3 via the standard communication control unit U2. When the custom field 231 is not attached to the USB standard command 230, the print management unit U3 determines that the reading of the custom class driver 152 has failed. The print management unit U3 delivers the print data D1 without the identifier D2 attached, to the standard print control unit U1, and thus causes the printer 200 to execute the printing that is limited via the standard communication control unit U2 or to stop the printing. When the printer 200 executes the printing, the printer 200 can properly execute the printing according to the print data D1 without the identifier D2 attached.

Thus, the aspect 2 can provide a preferred example where whether the reading of the custom class driver is successful or not is determined.

Aspect 3

Figure 5:
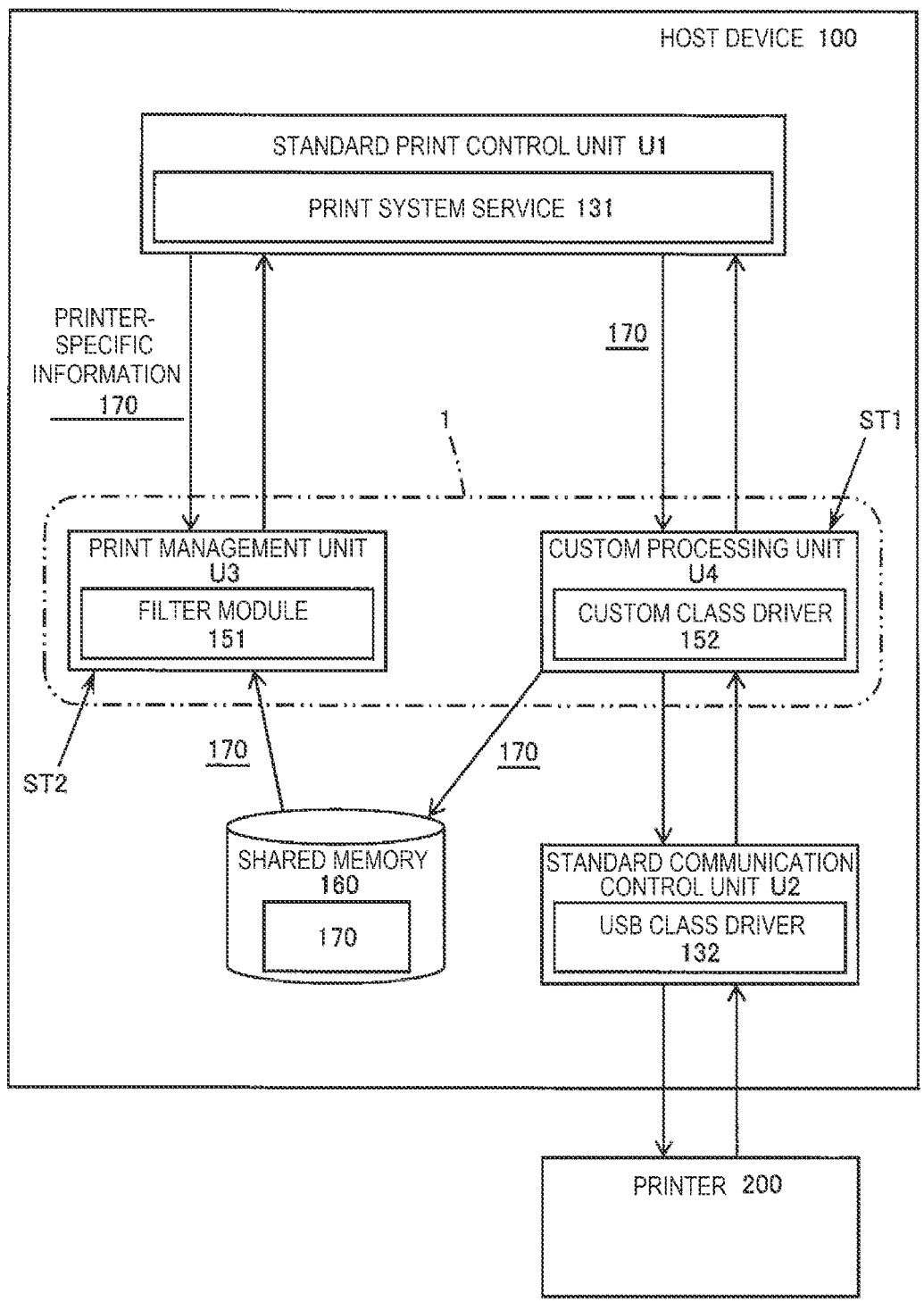
FIG. 5 schematically shows an example where printer-specific information is stored in a shared memory so as to determine the read state of the custom class driver.
Figure 8:
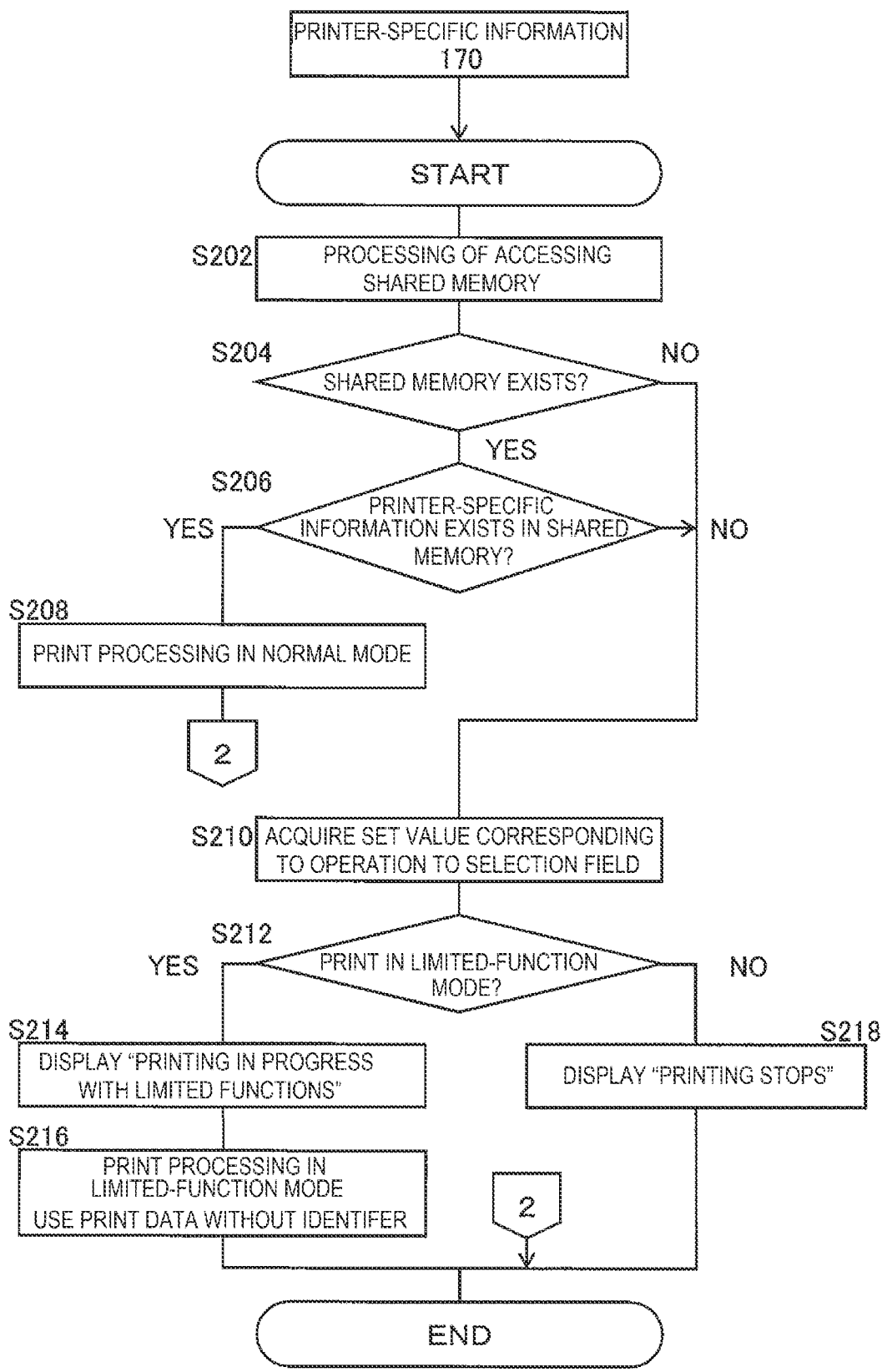
FIG. 8 is a flowchart showing another example of the print control processing corresponding to the read state of the custom class driver according to the flow shown in FIG. 5.

As shown in FIG. 5, the custom processing unit U4 may prepare a shared memory 160 shared by the custom processing unit U4 and the print management unit U3. The custom processing unit U4 may store printer-specific information 170 representing the printer 200 and delivered from the standard print control unit U1, into the shared memory 160. The print management unit U3 may receive the printer-specific information 170 from the standard print control unit U1, may determine whether the shared memory 160 where the printer-specific information 170 is stored exists or not, and thus may detect the read state, as shown in FIG. 8. When the shared memory 160 where the printer-specific information 170 is stored does not exist, the print management unit U3 may deliver the print data D1 without the identifier D2 attached, to the standard print control unit U1, and thus may cause the printer 200 to execute the printing that is limited via the standard communication control unit U2 or to stop the printing.

When the custom class driver 152 is read by the execution of the OS, the shared memory 160 shared by the custom processing unit U4 and the print management unit U3 is prepared and the printer-specific information 170 delivered from the standard print control unit U1 is stored into the shared memory 160. Therefore, when the shared memory 160 where the printer-specific information 170 delivered from the standard print control unit U1 to the print management unit U3 is stored exists, the print management unit U3 determines that the reading of the custom class driver 152 is successful, and delivers the print data D1 with the identifier D2 attached, to the standard print control unit U1, and thus can cause the printer 200 to execute customized printing.

When the reading of the custom class driver 152 by the execution of the OS has failed, the shared memory 160 shared by the custom processing unit U4 and the print management unit U3 is not prepared and the printer-specific information 170 is not stored into the shared memory 160. Therefore, when the shared memory 160 where the printer-specific information 170 delivered from the standard print control unit U1 to the print management unit U3 is stored does not exist, the print management unit U3 determines that the reading of the custom class driver 152 has failed. The print management unit U3 delivers the print data D1 without the identifier D2 attached, to the standard print control unit U1, and thus causes the printer 200 to execute the printing that is limited via the standard communication control unit U2 or to stop the printing. When the printer 200 executes the printing, the printer 200 can properly execute the printing according to the print data D1 without the identifier D2 attached.

Thus, the aspect 3, too, can provide a preferred example where whether the reading of the custom class driver is successful or not is determined.

The case where the shared memory 160 where the printer-specific information 170 is stored does not exist, includes the case where the shared memory 160 shared by the custom processing unit U4 and the print management unit U3 does not exist and the case where the shared memory 160 exists but the printer-specific information 170 is not stored in the shared memory 160.

Aspect 4

As shown in FIG. 6, the print management unit U3 may accept a selection of one of limitation processing in which the print data D1 without the identifier D2 attached is delivered to the standard print control unit U1, thus causing the printer 200 to execute the printing that is limited, via the standard communication control unit U2 (for example, the processing of steps S116 and S216 shown in FIGS. 7 and 8), and stop processing in which the printing is stopped (for example, the processing of steps S118 an S218 shown in FIGS. 7 and 8), as the processing to execute when the read state indicates a failure in reading the custom class driver 152. The print management unit U3 may accept the selection when the read state indicates a failure in reading the custom class driver 152. Thus, the user can select whether to execute the limited printing or stop the printing, when the reading of the custom class driver 152 has failed. Therefore, this aspect can improve the convenience of the user.

Aspect 5

As shown in FIGS. 7 and 8, when the read state indicates a failure in reading the custom class driver 152, the print management unit U3 may output information to the effect that the printer 200 is to execute the printing that is limited via the standard communication control unit U2 or to stop the printing (for example, "Printing in progress with limited functions" or "Printing stops" shown in FIGS. 7 and 8). Thus, the user can grasp that the reading of the custom class driver 152 has failed. Therefore, this aspect can improve the convenience of the user.

Aspect 6

As shown in FIG. 1, the print control device 1 may further include a display unit (for example, a display device 116) displaying the information to the effect that the printer 200 is to execute the printing that is limited via the standard communication control unit U2 or to stop the printing. Thus, by viewing the display unit (116), the user can grasp that the reading of the custom class driver 152 has failed. Therefore, this aspect can improve the convenience of the user.

Aspect 7

A print control method according to another aspect of the present technique is a print control method for a computer (100) in which a standard print control unit U1 functioning by execution of an operating system (OS) causes a printer 200 to execute printing according to print data D1 via a standard communication control unit U2 functioning by the execution of the operating system (OS). The print control method includes a custom processing step ST1 and a print management step ST2, as shown in FIGS. 2, 3, and 5. In the custom processing step ST1, the computer (100) executes a custom class driver 152 for hiding the function of the standard communication control unit U2 and for customizing processing of causing the printer 200 to execute the printing, based on the print data D1 delivered from the standard print control unit U1. In the print management step ST2, the computer (100) executes processing of attaching an identifier D2 to the print data D1 that goes through the custom class driver 152 and delivering the print data D1 with the identifier D2 attached, to the standard print control unit U1. In the custom processing step ST1, when the identifier D2 is attached to the print data D1 delivered from the standard print control unit U1, the computer (100) deletes the identifier D2 from the print data D1 and customizes the processing of causing the printer 200 to execute the printing, based on the print data D1. In the print management step ST2, the computer (100) detects a read state of the custom class driver 152 by the execution of the operating system (OS), and when the read state indicates a failure in reading the custom class driver 152, the computer (100) delivers the print data D1 without the identifier D2 attached, to the standard print control unit U1, and thus causes the printer 200 to execute the printing that is limited via the standard communication control unit U2 or to stop the printing.

When the custom class driver 152 is read by the execution of the OS, the identifier D2 is attached to the print data D1 that goes through the custom class driver 152. In this case, in the custom processing step ST1, the identifier D2 is deleted from the print data D1 and the processing of causing the printer 200 to execute the printing, based on the print data D1, is customized.

When the reading of the custom class driver 152 by the execution of the OS has failed, in the print management step ST2, the print data D1 without the identifier D2 attached is delivered to the standard print control unit U1 or the printing is stopped. When the printer 200 executes the printing, the printer 200 can properly execute the printing according to the print data D1 without the identifier D2 attached. Therefore, the aspect 7 can provide a print control method that restrains trouble in printing due to a failure in reading the custom class driver.

Aspect 8

A print control program PRO according to still another aspect of the present technique is a print control program PRO for a computer (100) in which a standard print control function FU1 that an operating system (OS) causes the computer (100) to implement causes a printer (200) to execute printing according to print data D1 via a standard communication control function FU2 that the operating system (OS) causes the computer (100) to implement, as shown in FIGS. 1 to 3 and the like. The print control program PRO includes a custom class driver 152 and a filter module 151. The custom class driver 152 causes the computer (100) to implement a custom processing function FU4 for hiding the standard communication control function FU2 and for customizing processing of causing the printer 200 to execute the printing, based on the print data D1 delivered from the standard print control function FU1. The filter module 151 causes the computer (100) to implement a print management function FU3 for attaching an identifier D2 to the print data D1 that goes through the custom class driver 152 and for delivering the print data D1 with the identifier D2 attached, to the standard print control function FU1. When the identifier D2 is attached to the print data D1 delivered from the standard print control function FU1, the custom processing function FU4 deletes the identifier D2 from the print data D1 and customizes the processing of causing the printer 200 to execute the printing, based on the print data D1. The print management function FU3 detects a read state of the custom class driver 152 by the execution of the operating system (OS). When the read state indicates a failure in reading the custom class driver 152, the print management function FU3 delivers the print data D1 without the identifier D2 attached, to the standard print control function FU1, and thus causes the printer 200 to execute the printing that is limited via the standard communication control function FU2 or to stop the printing.

When the custom class driver 152 is read by the execution of the OS, the identifier D2 is attached to the print data D1 that goes through the custom class driver 152. The custom processing function FU4 deletes the identifier D2 from the print data D1 and customizes the processing of causing the printer 200 to execute the printing, based on the print data D1.

When the reading of the custom class driver 152 by the execution of the OS has failed, the print management function FU3 delivers the print data D1 without the identifier D2 attached, to the standard print control function FU1, or stops the printing. When the printer 200 executes the printing, the printer 200 can properly execute the printing according to the print data D1 without the identifier D2 attached. Therefore, the aspect 8 can provide a print control program that restrains trouble in printing due to a failure in reading the custom class driver.

The present technique is also applicable to a multifunction device including the foregoing print control device, a print control method for the multifunction device, a control program for the multifunction device, a computer-readable medium storing the control program or a print control program, and the like. One of the foregoing devices may be made up of a plurality of distributed parts.

(2) Specific Example of Configuration of Computer Including Print Control Device FIG. 1 schematically shows the configuration of the host device 100 and the printer 200. FIG. 2 schematically shows the relationship between components of the host device 100 and the printer 200.

The host device 100 is a computer executing an OS 130 and functions as the print control device 1 by having the print control program PRO installed therein. In the host device 100, a CPU 111, a ROM 112, a RAM 113, a storage device 114, an input device 115, a display device 116, a communication I/F 117, and the like, are coupled together and can input and output information from and to each other. The CPU is an abbreviation for central processing unit. The ROM is an abbreviation for read-only memory. The RAM is an abbreviation for random-access memory. The I/F is an abbreviation for interface. The ROM 112, the RAM 113, and the storage device 114 are memories. At least the ROM 112 and the RAM 113 are semiconductor memories. The display device 116 is an example of the display unit. When the host device 100 is a desktop personal computer, the display device 116 is coupled to the outside of a main body where the CPU 111 or the like is provided. When the host device 100 is a laptop personal computer or a tablet terminal, the display device 116 is provided in a main body where the CPU 111 or the like is provided. In both cases, the print control device 1 outputs display data to the display device 116 and the display device 116 thus displays a screen corresponding to the display data.

The storage device 114 stores the OS 130, the print control program PRO, and the like. These are read out into the RAM 113 when appropriate and is used for print control processing. As the storage device 114, a non-volatile semiconductor memory such as a flash memory, a magnetic storage device such as a hard disk, or the like, can be used. As the input device 115, a pointing device, a hard key including a keyboard, a touch panel bonded to the surface of a display panel, or the like, can be used. As the display device 116, a liquid crystal display panel or the like can be used. The communication I/F 117 is connected to a communication I/F 210 of the printer 200 and inputs and outputs information such as the print data D1 and the USB standard command 230 from and to the printer 200. The communication I/Fs 117 and 210 communicate in conformity with a USB standard. The connection between the host device 100 and the printer 200 may be wired connection or wireless connection.

The host device 100 may have all the component 111 to 117 inside one casing but may be made up of a plurality of devices separated in such a way as to be able to communicate with each other.

The OS 130 includes Mac OS (trademark registered), Linux (trademark registered), Windows (trademark registered), and the like. A print system service 131 causing the host device 100 to function as the standard print control unit U1 and a USB class driver 132 causing the host device 100 to function as the standard communication control unit U2 are attached to the OS 130 shown in FIGS. 1 and 2. Therefore, the standard print control unit U1 and the standard communication control unit U2 function by the execution of the OS 130. The print system service 131 is also referred to as cupsd and causes the host device 100 to implement the standard print control function FU1. The USB class driver 132 is also referred to as USB printer class driver and causes the host device 100 to implement the standard communication control function FU2. The standard print control function FU1 causes the printer 200 to execute printing according to the print data D1 via the standard communication control function FU2. The standard communication control function FU2 communicates with the printer 200 in conformity with the USB standard.

The OS 130 can also cause the host device 100 to implement a function of wrapping, that is, hiding, the OS-standard USB class driver 132. The custom class driver 152, described later, is used to hide the function of the USB class driver 132.

The print control program PRO includes the custom class driver 152 for customizing the processing of causing the printer 200 to execute the printing, based on the print data D1 delivered from the standard print control function FU1, which the print system service 131 causes the host device 100 to implement. The custom class driver 152 is read by the host device 100 by the execution of the OS 130, causes the host device 100 to function as the custom processing unit U4, and hides the standard communication control function FU2, which the print system service 131 causes the host device 100 to implement. Therefore, the custom processing unit U4 functions by the execution of the custom class driver 152 for hiding the function of the standard communication control unit U2. The custom class driver 152 causes the host device 100 to implement the custom processing function FU4 for hiding the standard communication control function FU2 and for customizing the processing of causing the printer 200 to execute the printing, based on the print data D1 delivered from the standard print control function FU1.

The custom processing function FU4 includes a custom function provided by the provider of the custom class driver 152. The custom function includes a function of acquiring status information from the printer 200 such as information that there is no print paper or that the remaining amount of ink is small, immediately after the startup of the custom class driver 152, and displaying the status information on the display device 116, a function of acquiring error information from the printer 200 such as information that the printer 200 has run out of print paper or ink during printing, and displaying the error information on the display device 116, and the like. The custom function also includes shortening the interval of acquiring information from the printer 200 in order to increase the frequency of transmitting and receiving data to and from the printer 200.

The print control program PRO also includes the filter module 151 for delivering the print data D1 that goes through the custom class driver 152, to the print system service 131. The filter module 151 is also referred to as filter and is a module that generates the print data D1, based on the original data received from the print system service 131. The filter module 151 causes the host device 100 to function as the print management unit U3, attaches the identifier D2 to the print data D1 going through the custom processing unit U4, and delivers the print data D1 with the identifier D2 attached, to the standard print control unit U1. Therefore, the print management unit U3 functions by the execution of the filter module 151. The filter module 151 causes the host device 100 to implement the print management function FU3 for attaching the identifier D2 to the print data D1 that goes through the custom class driver 152 and for delivering the print data D1 with the identifier D2 attached, to the standard print control function FU1.

The host device 100 also has a filter module, not illustrated, for delivering print data that does not go through the custom class driver 152, to the print system service 131. This filter module delivers the print data D1 without the identifier D2 attached, to the print system service 131. The custom class driver 152, having received the print data D1 without the identifier D2 attached from the print system service 131, delivers the print data D1 directly to the USB class driver 132. The USB class driver 132, having received the print data D1, transmits the print data D1 to the printer 200 in conformity with the USB standard.

The printer 200 shown in FIG. 1 is an inkjet printer that ejects at least a C ink, an M ink, a Y ink, and a K ink as color materials from a recording head 220 and thus forms an output image IMO corresponding to the print data D1. In this case, C means cyan. M means magenta. Y means yellow. K means black. The recording head 220 is provided with the C, M, Y, K inks from corresponding ink cartridges Cc, Cm, Cy, Ck and ejects C, M, Y, K ink droplets 280 from corresponding nozzles Nc, Nm, Ny, Nk. As the ink droplets 280 land on a print paper ME0, ink dots are formed on the print paper ME0. Thus, a printed object having the output image IMO on the print paper ME0 is provided. As shown in FIG. 2, the printer 200 stores printer identification information 240 such as the name and the USB serial number of the printer 200 in a storage unit, not illustrated.

A flow of printing will now be described with reference to FIG. 2.

As the user performs an operation of instructing the host device 100 to execute the printing, the standard print control unit U1 having accepted this operation starts up the filter module 151 and the custom class driver 152 simultaneously and delivers the printer-specific information 170 representing the target printer 200 to the filter module 151 and the custom class driver 152. The execution of the filter module 151 causes the print management unit U3 to function. The execution of the custom class driver 152 causes the custom processing unit U4 to function. The printer-specific information 170 is, for example, a device URI (Uniform Resource Identifier of the device) including the device ID (device identification information), the USB serial number, the Internet Protocol address abbreviated as IP address, the Bonjour service name, or the like, of the printer 200. The standard print control unit U1 delivers original data that serves as the print data D1 to the print management unit U3. The print management unit U3 having received the original data converts the original data into the print data D1 that can be interpreted by the printer 200, and attaches the identifier D2 indicating that the provider of the filter module 151 is the provider of the custom class driver 152, to the print data D1. It can be said that the identifier D2 is a marker indicating the customization of the processing of causing the printer 200 to execute the printing. Therefore, the print management unit U3 executes the print management step ST2 of attaching the identifier D2 to the print data D1 that goes through the custom class driver 152 and delivering the print data D1 with the identifier D2 attached, to the standard print control unit U1. On receiving the print data D1 with the identifier D2 attached from the print management unit U3, the standard print control unit U1 delivers the print data D1 with the identifier D2 attached, to the custom processing unit U4.

On receiving the print data D1 from the standard print control unit U1, the custom processing unit U4 checks whether the identifier D2 is attached to the print data D1 or not. When the identifier D2 is attached to the print data D1, the custom processing unit U4 determines that the provider of the filter module 151 is the provider of the custom class driver 152. In this case, the custom processing unit U4 performs custom processing of deleting the identifier D2 from the print data D1, processing the print data D1 to be transmitted to the printer 200, and communicating with the printer 200 via the standard print control unit U1 in a provider-specific communication mode. Thus, the custom processing unit U4 executes the custom processing step ST1 of hiding the function of the standard communication control unit U2 and customizing the processing of causing the printer 200 to execute the printing, based on the print data D1 delivered from the standard print control unit U1. When the identifier D2 is not attached to the print data D1, the custom processing unit U4 determines that the filter module is different from the filter module 151, and delivers the print data D1 directly to the standard communication control unit U2. The standard communication control unit U2 communicates with the printer 200 in conformity with the USB standard and transmits the print data D1 to the printer 200.

Thus, the standard print control unit U1 causes the printer 200 to execute the printing according to the print data D1 via the standard communication control unit U2.

The OS 130 is updated from time to time. The host device 100 may fail in reading the custom class driver 152 by the execution of the OS 130, due to factors such as the update of the OS. When the host device 100 executing the OS 130 fails in reading the custom class driver 152, problems occur such as a malfunction of the printer 200 and an inability to execute proper communication.

Figure 9:
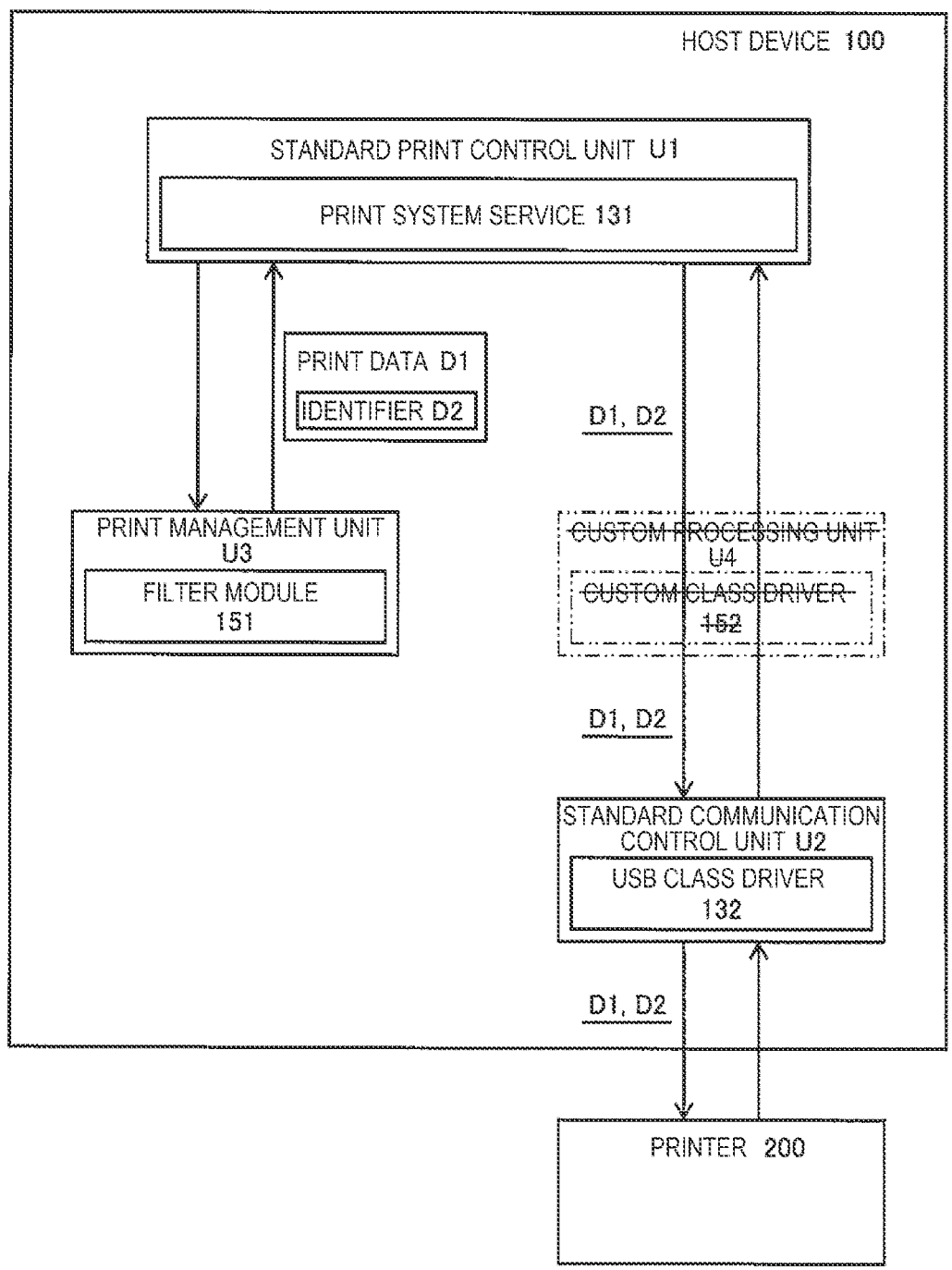
FIG. 9 schematically shows a flow of print data when the custom class driver is not read in a comparative example.

FIG. 9 schematically shows a flow of the print data D1 when the custom class driver 152 is not read, in a comparative example.

As shown in FIG. 9, the custom processing unit U4 does not exist between the standard print control unit U1 and the standard communication control unit U2. In this case, on receiving the print data D1 with the identifier D2 attached from the print management unit U3, the standard print control unit U1 delivers the print data D1 with the identifier D2 attached, directly to the standard communication control unit U2. The standard communication control unit U2 transmits the print data D1 along with the identifier D2 to the printer 200 in conformity with the USB standard. Since the identifier D2 is attached to the print data D1, the printer 200 cannot correctly interpret the print data D1 and therefore may malfunction or may not be able to properly communicate with the host device 100.

In this specific example, it is assumed that the print management unit U3 detects the read state of the custom class driver 152 by the execution of the OS 130 and executes processing corresponding to the read state. When the detected read state indicates a success in reading the custom class driver 152, the print management unit U3 executes the processing of attaching the identifier D2 to the print data D1 and delivering the print data D1 with the identifier D2 attached, to the standard print control unit U1. When the detected read state indicates a failure in reading the custom class driver 152, the print management unit U3 executes the limitation processing of causing the printer 200 to execute the printing in a limited-function mode or the stop processing of stopping the printing. When executing the limitation processing, the print management unit U3 delivers the print data D1 without the identifier D2 attached, to the standard print control unit U1, and thus causes the printer 200 to execute the limited printing via the standard communication control unit U2.

FIG. 3 schematically shows a flow in which the custom field 231 is attached to the USB standard command 230 so as to determine the read state of the custom class driver 152. FIG. 4 schematically shows a specific example where the custom field 231 is attached to the USB standard command 230.

The USB class driver 132 can cause the host device 100 to implement, for example, a function of acquiring the USB standard command 230 including the printer identification information 240. The printer identification information 240 is, for example, a 1284 Device ID such as the name or the USB serial number of the printer 200. When the print management unit U3 functioning by the execution of the filter module 151 requests the standard print control unit U1 to acquire the USB standard command 230, the USB standard command 230 is sent back to the print management unit U3 from the printer 200 via the standard communication control unit U2, the custom processing unit U4, and the standard print control unit U1. When the print management unit U3 requests the standard print control unit U1 to acquire the USB standard command 230 in the case where the reading of the custom class driver 152 has failed, the USB standard command 230 is sent back to the print management unit U3 from the printer 200 via the standard communication control unit U2 and the standard print control unit U1.

The flow in which the printer 200 is made to execute the printing according to the read state of the custom class driver 152 is as follows.

First, the print management unit U3 sends a USB standard command acquisition request RQ1 for acquiring the USB standard command 230 from the printer 200, to the standard print control unit U1. The standard print control unit U1 having received the USB standard command acquisition request RQ1 delivers the USB standard command acquisition request RQ1 to the custom processing unit U4. The custom processing unit U4 having received the USB standard command acquisition request RQ1 transmits the USB standard command acquisition request RQ1 to the printer 200 via the standard communication control unit U2. The printer 200 having received the USB standard command acquisition request RQ1 transmits the USB standard command 230 including the printer identification information 240 to the host device 100. The standard communication control unit U2 having received the USB standard command 230 delivers the USB standard command 230 to the custom processing unit U4.

At the top of FIG. 4, the USB standard command 230 delivered to the custom processing unit U4 is shown. This USB standard command 230 includes a field where a combination of a key and a value is repeated, in addition to the printer identification information 240. At the top of FIG. 4, a field including "Key1:Val1" and "Key2:Val2" as combinations of a key and a value is shown. The custom processing unit U4 having acquired the USB standard command 230 attaches the custom field 231 to the USB standard command 230 and delivers the USB standard command 230 with the custom field 231 attached, to the standard print control unit U1. The custom processing unit U4 attaches, for example, "Key3:Val3" as the custom field 231 to the existing field of "Key1:Val1, Key2:Val2" in the USB standard command 230, as shown at the bottom of FIG. 4.

On receiving the USB standard command 230 with the custom field 231 attached from the custom processing unit U4, the standard print control unit U1 delivers the USB standard command 230 with the custom field 231 attached, to the print management unit U3. When the reading of the custom class driver 152 has failed, the standard communication control unit U2 delivers the USB standard command 230 without the custom field 231 attached, to the standard print control unit U1. In this case, the standard print control unit U1 delivers the USB standard command 230 without the custom field 231 attached, to the print management unit U3. Therefore, the print management unit U3 determines whether the custom field 231 is attached to the USB standard command 230 delivered from the standard print control unit U1 or not, and thus can detect the read state of the custom class driver 152. When the custom field 231 is attached to the USB standard command 230, the reading of the custom class driver 152 is successful. In this case, the print management unit U3 executes the processing of attaching the identifier D2 to the print data D1 and delivering the print data D1 with the identifier D2 attached, to the standard print control unit U1. When the custom field 231 is not attached to the USB standard command 230, the reading of the custom class driver 152 has failed. In this case, the print management unit U3 executes the limitation processing of causing the printer 200 to execute the printing in the limited-function mode or the stop processing of stopping the printing. When executing the limitation processing, the print management unit U3 delivers the print data D1 without the identifier D2 attached, to the standard print control unit U1, and thus causes the printer 200 to execute the limited printing via the standard communication control unit U2.

As shown in FIG. 5, the printer-specific information 170 may be stored in the shared memory 160 so as to determine the read state of the custom class driver 152.

The process of executing the filter module 151 is a different process from the process of executing the custom class driver 152. Therefore, in the specific example shown in FIG. 5, the shared memory 160 is used as a mechanism that enables the sharing of information between the processes.

The flow in which the printer 200 is made to execute the printing according to the read state of the custom class driver 152 is as follows.

On accepting an operation of giving an instruction to execute the printing, the standard print control unit U1 simultaneously starts up the filter module 151 and the custom class driver 152 and delivers the printer-specific information 170 to both the print management unit U3 and the custom processing unit U4. The custom processing unit U4 having received the printer-specific information 170 prepares the shared memory 160 shared by the custom processing unit U4 and the print management unit U3, in the RAM 113 shown in FIG. 1, and stores the printer-specific information 170 delivered from the standard print control unit U1 into the shared memory 160. However, when the reading of the custom class driver 152 has failed, the shared memory 160 is not prepared and the printer-specific information 170 is not written into any shared memory.

The print management unit U3 having received the printer-specific information 170 determines whether the shared memory 160 where the printer-specific information 170 is stored exists or not, and thus can detect the read state of the custom class driver 152. When the shared memory 160 exists in the RAM 113 and the printer-specific information 170 is stored in the shared memory 160, the reading of the custom class driver 152 is successful. In this case, the print management unit U3 executes the processing of attaching the identifier D2 to the print data D1 and delivering the print data D1 with the identifier D2 attached, to the standard print control unit U1. When the shared memory 160 where the printer-specific information 170 is stored does not exist, the reading of the custom class driver 152 has failed. In this case, the print management unit U3 executes the limitation processing of causing the printer 200 to execute the printing in the limited-function mode or the stop processing of stopping the printing. When executing the limitation processing, the print management unit U3 delivers the print data D1 without the identifier D2 attached, to the standard print control unit U1, and thus causes the printer 200 to execute the limited printing via the standard communication control unit U2.

The host device 100 can detect the read state of the custom class driver 152 if the host device 100 can execute at least one of the processing shown in FIG. 3 and the processing shown in FIG. 5. However, the host device 100 may be configured to be able to execute both the processing shown in FIG. 3 and the processing shown in FIG. 5.

The user may be notified of the read state of the custom class driver 152. For example, when causing the printer 200 to execute the printing in the limited-function mode in the case of a failure in the reading, the print management unit U3 may cause the display device 116 shown in FIG. 1 to display a warning "Printing in progress with limited functions". This warning is an example of the information to the effect that the printer 200 is to execute the limited printing via the standard communication control unit U2. When stopping the printing in the case of a failure in the reading, the print management unit U3 may cause the display device 116 to display an error message "Printing stops". This error message is an example of the information to the effect that the printing is to stop. The print management unit U3 notifies a printer proxy of the information such as "Printing in progress with limited functions" or "Printing stops" and thus can cause the display device 116 to display the print state at the time of a failure in the reading, on a screen displaying the state of progress of printing. Thus, the user can be notified of the print state at the time of a failure in the reading. When the reading of the custom class driver 152 is successful, the print management unit U3 does not notify the printer proxy of anything.

The print management unit U3 can accept a selection of one of the limitation processing of causing the printer 200 to execute the printing in the limited-function mode and the stop processing of stopping the printing, as the processing to execute when the read state indicates a failure in reading the custom class driver 152. The processing of accepting the selection can be executed, using an option setting screen 300 for setting a printer driver option, as shown in FIG. 6.

FIG. 6 schematically shows the option setting screen 300 for selecting the processing to execute when failing in reading the custom class driver 152. The option setting screen 300 displayed on the display device 116 has a selection field 301 for whether to "execute printing with limited functions when failing in reading custom class driver" and an OK button 302 in addition to selection fields for whether to "reduce abrasion", "save blank paper", and the like. The print management unit U3 accepts an operation of selecting one of "ON" and "OFF" in the selection field 301. In this case, "ON" means executing the limitation processing when failing in the reading and "OFF" means executing the stop processing when failing in the reading. On accepting an operation on the OK button 302, the print management unit U3 stores a set value indicating "ON" or "OFF" in the selection field 301, into at least one of the RAM 113 and the storage device 114 shown in FIG. 1. If the set value indicates "ON", the print management unit U3 executes the limitation processing when failing in the reading. If the set value indicates "OFF", the print management unit U3 executes the stop processing when failing in the reading. In this way, the print management unit U3 executes the processing whose selection is accepted, when the read state indicates a failure in reading the custom class driver 152.

FIG. 7 shows an example where print control processing corresponding to the read state of the custom class driver 152 is executed according to the flow shown in FIG. 3. The print management unit U3 executes this processing. The print control processing shown in FIG. 7 includes processing of steps S102 to S118. Hereinafter, the description of "step" is omitted and step numbers are given in parentheses.

When the standard print control unit U1 delivers the original data to the print management unit U3, the print control processing starts and the printer 200 sends the USB standard command acquisition request RQ1 for acquiring the USB standard command 230 to the standard print control unit U1 (S102). Next, the print management unit U3 acquires the USB standard command 230 from the standard print control unit U1 (S104). When the custom processing unit U4 is functioning, the custom processing unit U4 having received the USB standard command acquisition request RQ1 from the standard print control unit U1 transmits the USB standard command acquisition request RQ1 to the printer 200 via the standard communication control unit U2 during the processing of S102 to S104. The custom processing unit U4 acquires the USB standard command 230 from the printer 200 via the standard communication control unit U2, attaches the custom field 231 to the USB standard command 230, and delivers the USB standard command 230 with the custom field 231 attached, to the standard print control unit U1. Therefore, the print management unit U3 receives the USB standard command 230 with the custom field 231 attached from the standard print control unit U1. Meanwhile, when the custom processing unit U4 is not functioning, the standard print control unit U1 delivers the USB standard command acquisition request RQ1 to the standard communication control unit U2 during the processing of S102 to S104. The standard communication control unit U2 transmits the USB standard command acquisition request RQ1 to the printer 200, acquires the USB standard command 230 from the printer 200, and delivers the USB standard command 230 to the standard print control unit U1. Therefore, the print management unit U3 receives the USB standard command 230 without the custom field 231 attached from the standard print control unit U1.

After the processing of S104, the print management unit U3 determines whether the custom field 231 is attached to the USB standard command 230 received from the standard print control unit U1 or not (S106).

When the custom field 231 is attached, the reading of the custom class driver 152 is successful. In this case, the print management unit U3 executes print processing in a normal mode where the identifier D2 is attached to the print data D1 and where the print data D1 with the identifier D2 attached is delivered to the standard print control unit U1 (S108), and then ends the print control processing. The custom processing unit U4 deletes the identifier D2 from the print data D1 delivered from the standard print control unit U1 and customizes the processing of causing the printer 200 to execute the printing, based on the print data D1.

Meanwhile, when the custom field 231 is not attached, the print management unit U3 acquires a set value corresponding to an operation to the selection field 301 shown in FIG. 6 (S110). Next, the print management unit U3 determines whether the set value is "ON" or not, that is, whether the set value means printing in the limited-function mode or not (S112).

When the set value is "ON", that is, when the set value means printing in the limited-function mode, the print management unit U3 outputs, to the display device 116 shown in FIG. 1, display data that causes the display device 116 to display a warning "Printing in progress with limited functions" (S114). The display device 116 displays the warning "Printing in progress with limited functions" according to the display data. Therefore, the user can grasp that the reading of the custom class driver 152 has failed, and can grasp that the printing in the limited-function mode is executed. After the warning is displayed, the print management unit U3 delivers the print data D1 without the identifier D2 attached, to the standard print control unit U1, thus causes the printer 200 to execute the limited printing via the standard communication control unit U2 (S116), and then ends the print control processing.

When the set value is "OFF", that is, when the set value means stopping the printing, the print management unit U3 outputs, to the display device 116, display data that causes the display device 116 to display an error message "Printing stops" (S118), and then ends the print control processing. The display device 116 displays the error message "Printing stops" according to the display data. Therefore, the user can grasp that the reading of the custom class driver 152 has failed, and can grasp that the printing stops.

FIG. 8 shows an example where print control processing corresponding to the read state of the custom class driver 152 is executed according to the flow shown in FIG. 5. The print management unit U3 executes this processing, too.

When the standard print control unit U1 delivers the printer-specific information 170 and the original data to the print management unit U3, the print control processing starts and the processing of accessing the shared memory 160 is executed (S202). Next, the print management unit U3 determines whether the shared memory 160 exists in the RAM 113 shown in FIG. 1 or not (S204). When the shared memory 160 does not exist, the reading of the custom class driver 152 has failed and therefore the print management unit U3 advances the processing to S210. When the shared memory 160 exists, the print management unit U3 determines whether the printer-specific information 170 exists in the shared memory 160 or not (S206). When the printer-specific information 170 exists in the shared memory 160, the reading of the custom class driver 152 is successful. In this case, the print management unit U3 executes print processing in a normal mode where the identifier D2 is attached to the print data D1 and where the print data D1 with the identifier D2 attached is delivered to the standard print control unit U1 (S208), and then ends the print control processing. The custom processing unit U4 deletes the identifier D2 from the print data D1 delivered from the standard print control unit U1 and customizes the processing of causing the printer 200 to execute the printing, based on the print data D1. When the printer-specific information 170 does not exist in the shared memory 160, the reading of the custom class driver 152 has failed and therefore the print management unit U3 advances the processing to S210.

In S210, the print management unit U3 acquires a set value corresponding to an operation to the selection field 301 shown in FIG. 6. Next, the print management unit U3 determines whether the set value is "ON" or not, that is, whether the set value means printing in the limited-function mode or not (S212).

When the set value is "ON", that is, when the set value means printing in the limited-function mode, the print management unit U3 causes the display device 116 shown in FIG. 1 to display a warning "Printing in progress with limited functions" (S214). Therefore, the user can grasp that the reading of the custom class driver 152 has failed, and can grasp that the printing in the limited-function mode is executed. After the warning is displayed, the print management unit U3 delivers the print data D1 without the identifier D2 attached, to the standard print control unit U1, thus causes the printer 200 to execute the limited printing via the standard communication control unit U2 (S216), and then ends the print control processing.

When the set value is "OFF", that is, when the set value means stopping the printing, the print management unit U3 causes the display device 116 to display an error message "Printing stops" (S218) and then ends the print control processing. Therefore, the user can grasp that the reading of the custom class driver 152 has failed, and can grasp that the printing stops.

As described above, the user can grasp that the reading of the custom class driver 152 by the execution of the OS has failed, and the user can also select print processing at the time of a failure in the reading. When executing the printing in the limited-function mode in the case of a failure in the reading, the print data D1 without the identifier D2 attached is delivered from the print management unit U3 to the standard print control unit U1 and thus delivered to the printer 200 via the standard communication control unit U2. Thus, the printer 200 can properly execute the printing according to the print data D1 without the identifier D2 attached, instead of malfunctioning or printing information that makes no sense. Therefore, this specific example can restrain trouble in printing due to a failure in reading the custom class driver 152.

(3) Modification Examples

Various modification examples of the present disclosure are conceivable.

For example, the printer is not limited to an inkjet printer and may also be an electrophotographic printer such as a laser printer, a copy machine, a facsimile, a multifunction machine, a three-dimensional printer, or the like.

(4) Conclusion

As described above, according to various aspects of the present disclosure, a technique or the like for restraining trouble in printing due to a failure in reading a custom class driver can be provided. Even a technique or the like that does not include a component according to a dependent claim but only includes components according to an independent claim achieves the foregoing fundamental effects and advantages.

A configuration where individual components disclosed in the foregoing examples are replaced with each other or combined in different ways, a configuration where individual components disclosed in the related-art technique and the foregoing examples are replaced with each other or combined in different ways, or the like, can be implemented as well. The present disclosure includes these configurations and the like.

What is claimed is:

1. A print control device for a computer in which a standard print control unit functioning by execution of an operating system causes a printer to execute printing according to print data via a standard communication control unit functioning by the execution of the operating system, the print control device comprising:

a custom processing unit functioning by execution of a custom class driver for hiding the function of the standard communication control unit and for customizing processing of causing the printer to execute the printing, based on the print data delivered from the standard print control unit; and a print management unit attaching an identifier to the print data that goes through the custom processing unit and delivering the print data with the identifier attached, to the standard print control unit, wherein when the identifier is attached to the print data delivered from the standard print control unit, the custom processing unit deletes the identifier from the print data and customizes the processing of causing the printer to execute the printing, based on the print data, and the print management unit detects a read state of the custom class driver by the execution of the operating system, and when the read state indicates a failure in reading the custom class driver, the print management unit delivers the print data without the identifier attached, to the standard print control unit, and thus causes the printer to execute the printing that is limited via the standard communication control unit or to stop the printing.

2. The print control device according to claim 1, wherein the standard communication control unit communicates with the printer in conformity with a USB standard, the print management unit requests the standard print control unit to acquire a USB standard command from the printer, the custom processing unit, on receiving a request to acquire the USB standard command from the standard print control unit, acquires the USB standard command from the printer via the standard communication control unit, attaches a custom field to the USB standard command, and delivers the USB standard command with the custom field attached, to the standard print control unit, and the print management unit determines whether the custom field is attached to the USB standard command delivered from the standard print control unit or not, and thus detects the read state, and when the custom field is not attached, the print management unit delivers the print data without the identifier attached, to the standard print control unit, and thus causes the printer to execute the printing that is limited via the standard communication control unit or to stop the printing.

3. The print control device according to claim 1, wherein the custom processing unit prepares a shared memory shared by the custom processing unit and the print management unit and stores printer-specific information representing the printer and delivered from the standard print control unit into the shared memory, and the print management unit receives the printer-specific information from the standard print control unit, determines whether the shared memory where the printer-specific information is stored exists or not, and thus detects the read state, and when the shared memory where the printer-specific information is stored does not exist, the print management unit delivers the print data without the identifier attached, to the standard print control unit, and thus causes the printer to execute the printing that is limited via the standard communication control unit or to stop the printing.

4. The print control device according to claim 1, wherein the print management unit accepts a selection of one of limitation processing of delivering the print data without the identifier attached, to the standard print control unit, and thus causing the printer to execute the printing that is limited via the standard communication control unit, and stop processing of stopping the printing, as processing to execute when the read state indicates a failure in reading the custom class driver, and executes the processing whose selection is accepted, when the read state indicates a failure in reading the custom class driver.

5. The print control device according to claim 1, wherein when the read state indicates a failure in reading the custom class driver, the print management unit outputs information to the effect that the printer is to execute the printing that is limited via the standard communication control unit or to stop the printing.

6. The print control device according to claim 5, further comprising:

a display unit displaying the information to the effect that the printer is to execute the printing that is limited via the standard communication control unit or to stop the printing.

7. A print control method for a computer in which a standard print control unit functioning by execution of an operating system causes a printer to execute printing according to print data via a standard communication control unit functioning by the execution of the operating system, the print control method comprising:

a custom processing step in which the computer executes a custom class driver for hiding the function of the standard communication control unit and for customizing processing of causing the printer to execute the printing, based on the print data delivered from the standard print control unit; and a print management step in which the computer executes processing of attaching an identifier to the print data that goes through the custom class driver and delivering the print data with the identifier attached, to the standard print control unit, wherein in the custom processing step, when the identifier is attached to the print data delivered from the standard print control unit, the computer deletes the identifier from the print data and customizes the processing of causing the printer to execute the printing, based on the print data, and in the print management step, the computer detects a read state of the custom class driver by the execution of the operating system, and when the read state indicates a failure in reading the custom class driver, the computer delivers the print data without the identifier attached, to the standard print control unit, and thus causes the printer to execute the printing that is limited via the standard communication control unit or to stop the printing.

8. A non-transitory computer-readable storage medium storing a print control program, the print control program being for a computer in which a standard print control function that an operating system causes the computer to implement causes a printer to execute printing according to print data via a standard communication control function that the operating system causes the computer to implement, the print control program including a custom class driver and a filter module, wherein the custom class driver causes the computer to implement a custom processing function for hiding the standard communication control function and for customizing processing of causing the printer to execute the printing, based on the print data delivered from the standard print control function, the filter module causes the computer to implement a print management function for attaching an identifier to the print data that goes through the custom class driver and for delivering the print data with the identifier attached, to the standard print control function, when the identifier is attached to the print data delivered from the standard print control function, the custom processing function deletes the identifier from the print data and customizes the processing of causing the printer to execute the printing, based on the print data, and the print management function detects a read state of the custom class driver by the execution of the operating system, and when the read state indicates a failure in reading the custom class driver, the print management function delivers the print data without the identifier attached, to the standard print control function, and thus causes the printer to execute the printing that is limited via the standard communication control function or to stop the printing.

* * * * *